June 20, 1944.  J. S. McALLISTER  2,351,827.

CUTTING TOOL

Filed Nov. 9, 1942

Inventor
Joseph S. McAllister
By Whittemore Hulbert & Belknap
Attorneys

Patented June 20, 1944

2,351,827

UNITED STATES PATENT OFFICE 2,351,827

CUTTING TOOL

Joseph S. McAllister, Ann Arbor, Mich.

Application November 9, 1942, Serial No. 465,040

1 Claim. (Cl. 10—141)

This invention relates generally to tools and refers more particularly to cutting tools of the type having a shank provided with stock removing surfaces adapted to be inserted into an opening or bore of a work blank.

Tools of the above general type are usually formed of "high-speed" steel alloy and frequently fracture or break while being used. The break oftentimes takes place at a point so far within the work that removal of the broken part presents a serious problem and incurs expensive delays in the manufacture of the work.

The present invention overcomes the above objection by providing a tool having means which enables a broken part of the tool to be simply and quickly removed regardless of the extent to which the broken part is lodged in the work.

An object of this invention is to provide a tool comprising a work cutting portion or shank having a tough metal core polygonally shaped in cross section and extending axially of the shank from one end of the latter to a point adjacent the opposite end. In accordance with this invention the shank is formed with a bore polygonally shaped in cross section and a correspondingly shaped metal core member is fitted into the bore. Thus, if for any reason the tool should break during operation, torque is applied to the broken part of the tool through the core and this part may be readily removed by merely turning the core in the opposite direction.

Still another object of this invention is to provide a tool of the above type wherein the core reinforces the tool and imparts substantially greater strength to the tool.

The foregoing, as well as other objects, will be made more apparent as this description proceeds, especially when considered in connection with the accompanying drawing, wherein.

Figure 1:
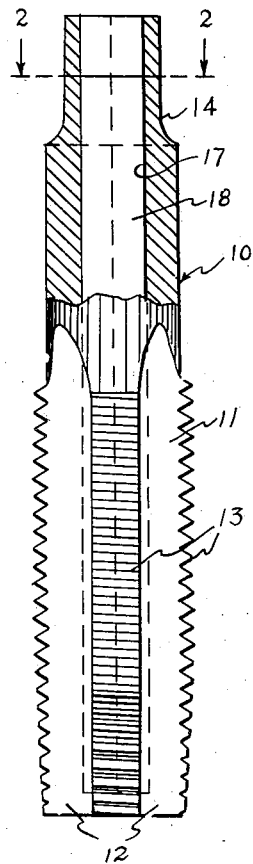
Figure 1 is a side elevational view of a cutting tool constructed in accordance with this invention and having certain parts broken away.

For the purpose of illustrating the present invention, I have selected a cutting tool commonly known in the art as a tap, although it will be apparent as this description proceeds that the invention may also be advantageously used in connection with practically any type of tool having a cutting portion adapted to form or to be inserted into a bore in a work piece.

With the above in view reference will now be made to the drawing wherein it will be noted that the reference character 10 indicates a tap comprising a shank 11 having the usual flutes 12 formed in the exterior surface thereof and having thread cutting surfaces 13 formed on the flutes 12. The flutes 12 extend in the general direction of the axis of the shank from the inner or lower end of the latter and the upper or outer end 14 of the shank is polygonally shaped in cross section in order to enable a turning torque to be applied directly to the shank.

In use, the end 14 of the tap is coupled in any suitable manner to a rotatable driving member and the fluted end of the tap is inserted into a bore 15 of a suitable work blank 16 to form threads on the inner surface of the bore. Taps of the above type are usually formed of a relatively hard steel or alloy and frequently fracture during use in such a manner that a part of the fluted or cutting end of the tap becomes firmly lodged in the lower regions of the bore. Removal of the broken part of the tap from the bore without damaging the work or threads formed by the tap oftentimes consumes considerable time and effort. In fact, it frequently happens that the work is damaged to such an extent that it must be scrapped or repaired at considerable cost.

In accordance with the present invention, a broken part of the tap may be simply and readily removed without damage to either the threads or the work. In detail, the shank 11 of the tool is formed with an axially extending bore 17 polygonally shaped in cross section. The bore 17 extends from the end 14 of the shank to a point adjacent the opposite end and, in the present instance, is triangular shape in cross section. It is to be understood, however, that the cross sectional contour of the bore 17 may be of any shape capable of coacting with a driving member to apply a turning torque to the shank. In the present instance, the driving member is in the form of a core 18 having a cross sectional area corresponding to the cross sectional area of the bore and adapted to fit into the latter. The core is preferably formed of a tough metal and extends for substantially the full length of the bore 17.

Figure 3:
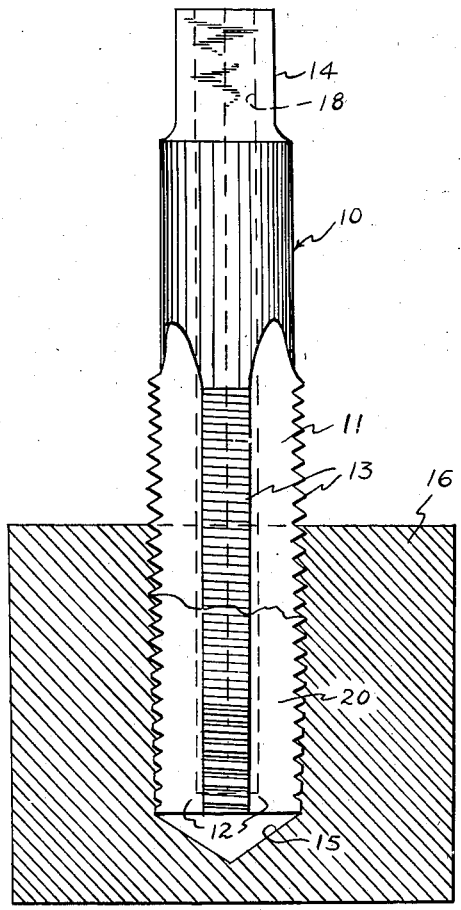
Figure 3 is a fragmentary sectional view illustrating the manner in which a broken part of the tool may be removed from a work piece.
Figure 2:
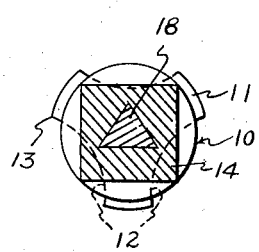
Figure 2 is a cross sectional view taken on the line 2—2 of Figure 1.

During normal operation of the tap the core 18 is relieved of the driving torque applied to the end 14 of the shank by the driving member, not shown. However, if the shank 11 of the tap should fracture at any point along its length, torque is transmitted to the fractured part (indicated in Figure 3 by the reference character 20) by the core and the fractured part may be readily "backed out" of the threaded bore by turning the core in the opposite direction.

Thus, from the foregoing it will be observed that I have provided a relatively simple and inexpensive means for quickly removing a fractured or broken tap from a bore in a work blank regardless of the extent to which the broken part is lodged in the work blank. It will also be understood that the core 18 not only renders quick removal of the fractured part of the tap from the work but, in addition, acts as a reinforcement and imparts added strength to the tap.

What I claim as my invention is:

A tool comprising a shank having a bore polygonally shaped in cross section and extending axially of the shank, cutting surfaces on the shank surrounding the bore, and a core composed of relatively tough metal, said core corresponding in cross sectional area to the cross sectional area of the bore and tightly fitted and supported within the bore.

JOSEPH S. McALLISTER.